(12) United States Patent　　　(10) Patent No.:　US 12,689,869 B2

Else et al.　　　　　　　　　　　　　(45) Date of Patent:　　　Jul. 21, 2026

(54) AUTOMATICALLY ASSIGNING ZONE NUMBERS IN A SECURITY SYSTEM

(71) Applicant: The ADT Security Corporation, Boca Raton, FL (US)

(72) Inventors: Steven Else, Deerfield Beach, FL (US); Jatin Patel, Boca Raton, FL (US)

(73) Assignee: The ADT Security Corporation, Boca Raton, FL (US)

( * ) Notice: Subject to any disclaimer, the term of this patent is extended or adjusted under 35 U.S.C. 154(b) by 534 days.

(21) Appl. No.: 18/088,372

(22) Filed: Dec. 23, 2022

(65) Prior Publication Data

US 2024/0214768 A1　　Jun. 27, 2024

(51) Int. Cl.
　H04W 4/021　　　(2018.01)
　G06K 7/14　　　(2006.01)
　G08B 25/10　　　(2006.01)
　H04W 4/38　　　(2018.01)

(52) U.S. Cl.
　CPC .......... H04W 4/021 (2013.01); G06K 7/1417 (2013.01); G08B 25/10 (2013.01); H04W 4/38 (2018.02)

(58) Field of Classification Search
　CPC . H04L 63/20; H04L 63/1416; H04L 63/1433; H04L 67/12; H04W 12/08; H04W 4/029; H04W 4/02; H04W 4/021; G06F 21/32; G06F 21/554; G06F 21/577; G05B 19/0428

See application file for complete search history.

(56)　　　　　References Cited

U.S. PATENT DOCUMENTS

| | | | |
|---|---|---|---|
| 6,965,313 B1 | 11/2005 | Saylor et al. | |
| 8,836,467 B1 | 9/2014 | Cohn et al. | |
| 10,735,249 B2 | 8/2020 | Baum et al. | |
| 10,944,837 B2 * | 3/2021 | Tiwari | H04L 12/2803 |
| 2015/0102922 A1 * | 4/2015 | Witmer | G08B 13/2491 340/527 |
| 2016/0094883 A1 * | 3/2016 | Tidwell | H04N 21/812 725/109 |
| 2016/0261931 A1 | 9/2016 | Fadell et al. | |
| 2017/0017214 A1 * | 1/2017 | O'Keeffe | G05B 15/02 |
| 2021/0020007 A1 | 1/2021 | Vazirani | |
| 2021/0158681 A1 | 5/2021 | Horrocks et al. | |

* cited by examiner

*Primary Examiner* — Khalid W Shaheed
(74) *Attorney, Agent, or Firm* — Weisberg I.P. Law, P.A.

(57)　　　　ABSTRACT

An apparatus and method are described. In at least one embodiment, a premises security system includes processing circuitry configured to: detect a change to a quantity of a plurality of premises devices located at the premises where the change includes one of an addition or a removal of a first premises device of the plurality of premises devices, and in response to detecting the change to the quantity of the plurality premises devices, update a configuration including a plurality of zone numbers assigned to the plurality of premises devices by at least making at least one modification to at least one of the plurality of zone numbers.

20 Claims, 3 Drawing Sheets

AUTOMATICALLY ASSIGNING ZONE NUMBERS IN A SECURITY SYSTEM

TECHNICAL FIELD

The present disclosure is generally related to premises security and to methods and systems for management of premises devices of premises security systems.

BACKGROUND

Modern premises security and automation systems typically include multiple devices of various types, including input devices, sensors, detectors, and actuators. Many also include functionality to assign zone numbers to such devices to, e.g., group functionality, location, or apply policies or configurations to multiple devices simultaneously. Some systems simply automatically assign the next available zone number to any newly-added device.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

Figure 1:
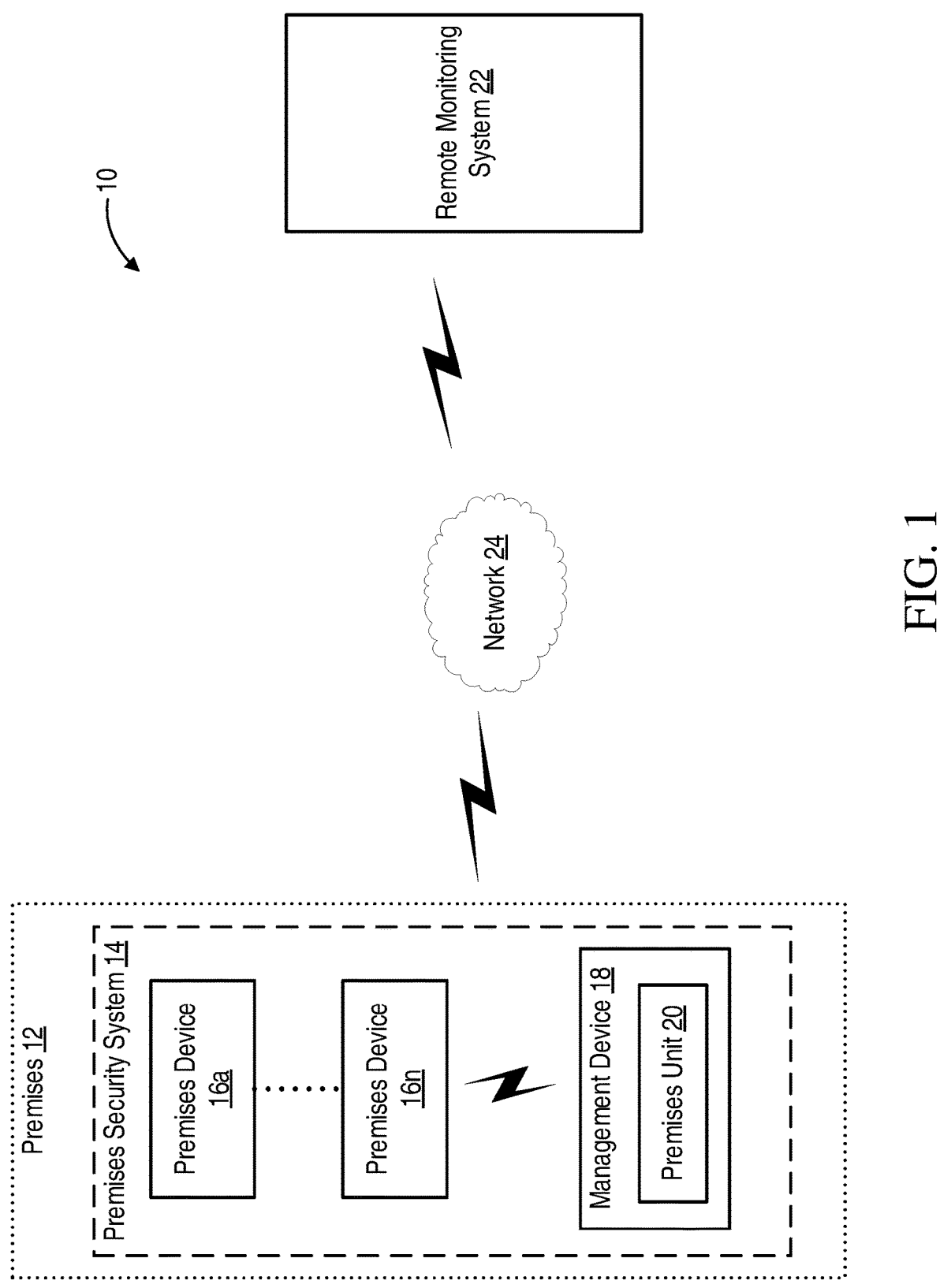
FIG. 1 is a diagram of an example system according to some embodiments of the present disclosure.

Before describing in detail exemplary embodiments, it is noted that embodiments may reside in combinations of apparatus components and processing steps related to management of premises devices of a premises security system. Accordingly, components have been represented where appropriate by conventional symbols in the drawings, focusing on details that facilitate understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

Referring to the drawing figures, in which like elements are referred to by like reference numerals, there is shown in FIG. 1 a diagram of an example system 10 comprising a premises security system 14 positioned at the premises 12. Premises security system 14 comprises one or more premises devices 16a and 16n (collectively referred to as premises device 16). System 10 includes a management device 18 for controlling and/or managing of the premises security system 14. For example, management device 18 comprises premises unit 20, which may be configured to perform various functionalities associated with the premises security system 14, including those described herein. Further, any premises device 16 can be in simultaneous communication and/or configured to separately communicate with more than one other premises device 16 and/or other premises security system 14, and/or remote monitoring system 22 (e.g., remote monitoring center(s)), and/or other system 10. Premises security system 14 may refer to any system, e.g., a premises security system, a premises automation system, a security and automation system such as a home security and automation system.

Further, each premises device 16 may include or be one or more of sensors, detectors, control panels, control devices, images capture devices, life safety devices, lifestyle devices and other devices. For example, the types of sensors may include various life safety related sensors, such as motion sensors, fire sensors, carbon monoxide sensors, flooding sensors and contact sensors, among other sensor types. The control devices may include, for example, one or more lifestyle (e.g., premises automation) related devices configured to adjust at least one premises setting such as lighting, temperature, energy usage, door lock and power settings, among other settings associated with the premises or devices on the premises. Image capture devices may include digital cameras and/or video cameras, among other image capture devices.

System 10 may also include a remote monitoring system 22 in communication with premises security system 14 via network 24. Remote monitoring system 22 may be configured to perform certain monitoring, configuration and/or control functions associated with system 10. For example, with respect to fire and carbon monoxide detectors, monitoring data may include information regarding carbon monoxide readings, smoke detection readings, sensor location and time of readings, among other information related to these detectors that may be communicated with remote monitoring system 22. In yet another example, with respect to a door contact detector, monitoring data may include sensor location and time of detection, among other data related to the door contact detection that may be communicated to remote monitoring system 22.

Premises system data, e.g., alarm event data from the premises devices 16, may be used by the remote monitoring system 22 for performing various life safety response processes in notifying the owner of the premises, determining whether an actual alarm event is occurring at the premises, and notifying any appropriate response agency (e.g., police, fire, emergency response, other interested parties such as premises owners, etc.).

As noted above, system 10 may include network 24 (which may refer to a plurality of networks), which may be configured to provide direct and/or indirect communication, e.g., wired and/or wireless communication, between any two or more components of system 10, e.g., premises security system 14, premises device 16, premises unit 20, remote monitoring system 22, etc. In a non-limiting example, premises device 16 of premises security system 14 may communicate with the remote monitoring system 22 via network 24, e.g., to provide premises system data associated with premises security system 14. Although network 24 is shown as an intermediate network between components/devices of system 10, any component or device may communicate directly with any other component/device of system 10.

Figure 2:
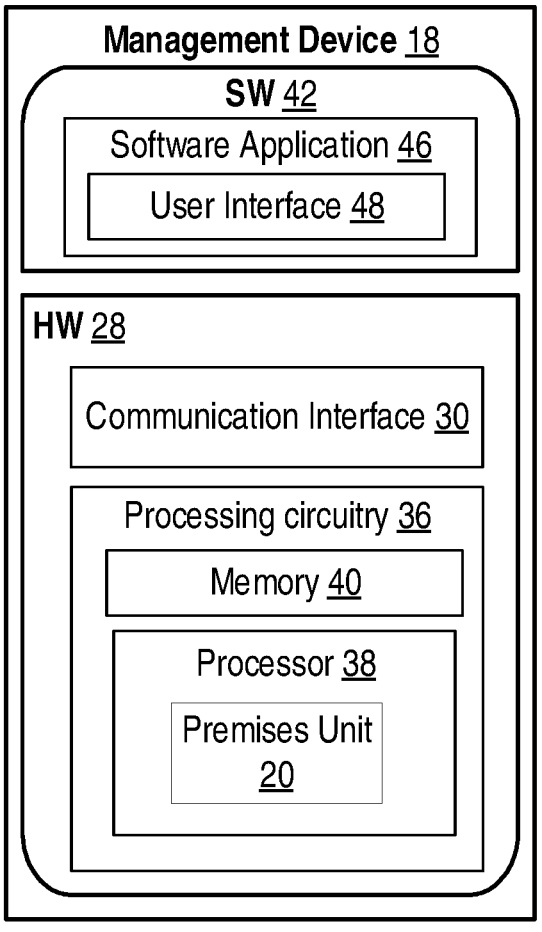
FIG. 2 is a block diagram of an example of a management device in the system of FIG. 1 according to some embodiments of the present disclosure.

Example implementations, in accordance with embodiments of system 10 discussed in the preceding paragraphs will now be described with reference to FIG. 2. The management device 18 includes hardware 28. The hardware 28 may include processing circuitry 36. The processing circuitry 36 may include a processor 38 and a memory 40. In particular, in addition to or instead of a processor, such as a central processing unit, and memory, the processing circuitry 36 may comprise integrated circuitry for processing and/or control, e.g., one or more processors and/or processor cores, field programmable gate arrays (FPGAs), and/or application specific integrated circuits (ASICs) adapted to execute instructions. The processor 38 may be configured to access (e.g., write to and/or read from) the memory 40, which may comprise any kind of volatile and/or nonvolatile memory, e.g., cache, buffer memory, random access memory (RAM), read-only memory (ROM), optical memory, and/or erasable programmable read-only memory (EPROM). Further, memory 40 may be configured as a storage device.

Hardware 28 of premises management device 18 may include communication interface 30 enabling management device 18 to communicate with any component or device of system 10. For example, communication interface 30 may be configured for establishing and maintaining at least a wireless or wired connection with any component or device of system 10, such as premises device 16, etc. The communication interface 30 may be formed as or may include, for example, one or more radio frequency (RF) transmitters, one or more RF receivers, and/or one or more RF transceivers.

Management device 18 further has software 42 (which may include software application 46 and/or user interface 48) stored internally in, for example, memory 40, or stored in external memory (e.g., database, storage array, network storage device, etc.) accessible by the management device 18 via an external connection. Software application 46 may include any software or program configured to perform the steps or processes of the present disclosure, e.g., providing an interface for a user (e.g., user interface 48) to provide an input to the management device 18 and/or receive an output from the management device 18. Further, software application 46 may run and/or be included directly as part of software 42 and/or management device 18. Software application 46 may be virtualized and/or running outside management device 18 and/or any of the components of management device 13.

The processing circuitry 36 may be configured to control any of methods and/or processes described herein and/or to cause such methods, and/or processes to be performed, e.g., by management device 18. Processor 38 corresponds to one or more processors 38 for performing management device

13 functions described herein. The memory 40 is configured to store data and/or files such as premises system data and/or other information/data described herein. In some embodiments, the software 42 may include instructions that, when executed by the processor 38 and/or processing circuitry 36, causes the processor 38 and/or processing circuitry 36 to perform the processes described herein with respect to management device 18. For example, processing circuitry 36 of the management device 18 may include premises unit 20, which may be configured to perform any of the processes, steps, or functions described herein, e.g., collect and/or process and/or cause management device 18 to transmit premises system data, such as premises system data received from premises security system 14.

Figure 3:
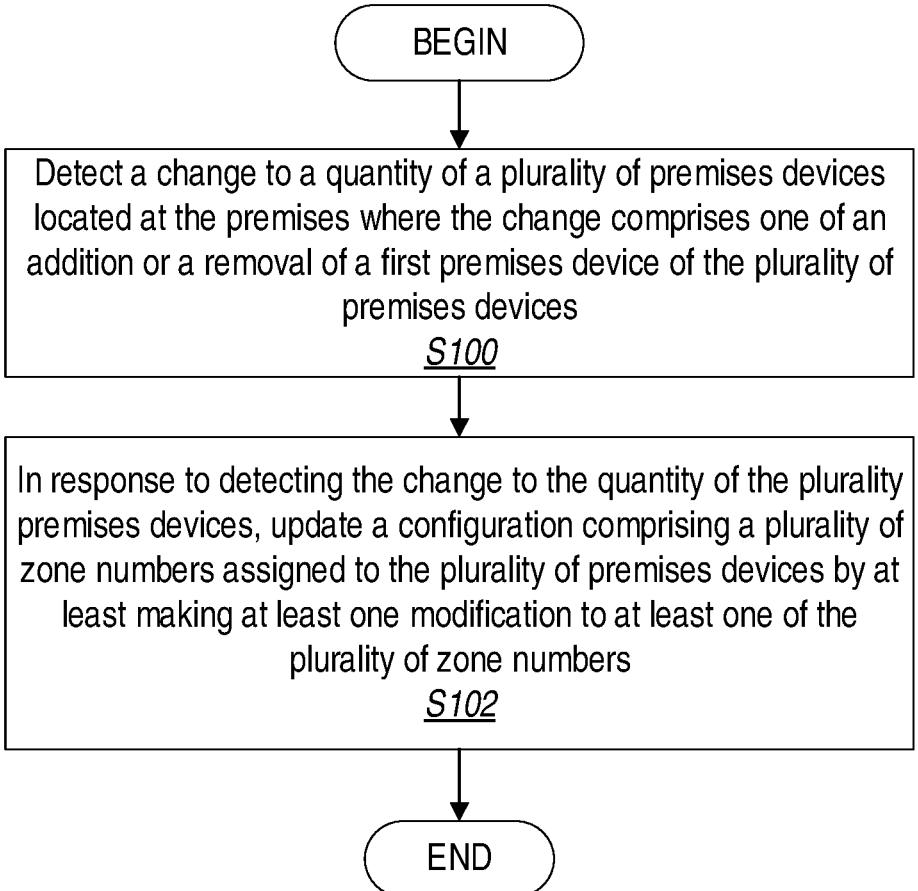
FIG. 3 is a flowchart of an example process in performed in the management device of FIG. 2 according to some embodiments of the present disclosure.

FIG. 3 is a flowchart of an example process in management device 18 according to some embodiments of the present disclosure. One or more blocks described herein may be performed by one or more elements of management device 18, such as by one or more of processing circuitry 36 (including the premises unit 20) and/or processor 68 and/or communication interface 60. Management device is configured to detect (Block S100) a change to a quantity of a plurality of premises devices 16 located at the premises where the change comprises one of an addition or a removal of a first premises device 16 of the plurality of premises devices 16, as described herein. Management device 18 is configured to, in response to detecting the change to the quantity of the plurality premises devices 16, update (Block S102) a configuration comprising a plurality of zone numbers assigned to the plurality of premises devices 16 by at least making at least one modification to at least one of the plurality of zone numbers.

According to one or more embodiments, the processing circuitry 36 is further configured to cause transmission to a remote monitoring system 22 of data representing the configuration subsequent to making the modification to the at least one of the plurality of zone numbers.

According to one or more embodiments, the change to the quantity of the plurality of premises devices 16 is the addition of the first premises device 16, and the at least one modification to at least one of the plurality of zone numbers comprises: the assignment of the zone number of the first premises device 16, and a modification of the zone number of at least one other of the plurality of premises devices 16.

According to one or more embodiments, the assignment of the zone number of the first premises device 16 is based on at least one of a location within the premises of the first premises device 16 or a type of the first premises device 16.

According to one or more embodiments, the change to the quantity of the plurality of premises devices 16 is the removal of the first premises device 16, and the at least one modification to at least one of the plurality of zone numbers comprises the removal of the zone number of the first premises device, and a modification of the zone number of at least one other of the plurality of premises devices 16.

According to one or more embodiments, the processing circuitry 36 is further configured to identify the first premises device 16 upon request by a person.

According to one or more embodiments, the identification is based on at least one of a quick response (QR) code or barcode.

According to one or more embodiments, the processing circuitry 36 is further configured to update a monitoring setting of each of the plurality of premises devices 16.

According to one or more embodiments, the monitoring setting includes a sensor sensitivity setting.

According to one or more embodiments, the monitoring setting is based on a respective zone number of each of the plurality of premises devices 16.

Having described the general process flow of arrangements of the disclosure and having provided examples of hardware and software arrangements for implementing the processes and functions of the present disclosure, the sections below provide details and examples of arrangements for management of premises devices of a premises security system.

In at least one embodiment, the management device 18, such as via processing circuitry 36, automatically arranges zone numbers of premises device 16 based on the location of the premises device 16 and/or premises device type 16 when assigning zone number to a premises device 16 and will automatically arrange zone numbers throughout the system 10 to accommodate a new premises device 16, such as a new sensor or when a sensor is permanently removed from the system 10. This arrangement will also push, i.e., transmit, updated zone number list to all the relevant databases, such as the remote monitoring system 22.

According to various embodiment, the process of automatically assigning zone numbers may be a two-step process. First, the installer, e.g., installation technician, will select the area of the premise where a new premises device 16 is being enrolled. For example, the installer may select Living Room, Family Room, Master Bedroom, Kitchen, Garage, Bedroom 1, Bedroom 2, etc., and provide this information to the management device 18.

Next, the installer provides the management device 18 with the type of the premises device 16 being installed. For example, door sensor, window sensor, motion sensor, glass break sensor, smoke detector, carbon monoxide detector, water sensor, camera, etc. Based on the above information, in at least one embodiment, the management device 18 automatically determines and assigns a zone number to the new premises device 16.

In at least one embodiment, the system 10 is configured to automatically assign and/or arrange zone numbers based on the location and type of the premises device 16 when assigning zone number to a device, and the system 10 will automatically arrange zone numbers throughout the system to accommodate a new premises device 16, e.g., a sensor, or when a premises devise 16 is removed from the system. In at least one embodiment, the updated zone number list is transmitted to all the relevant databases such as the remote monitoring system 22.

In at least one embodiment, sensors are grouped into an area of the premise where they are being installed. As a non-limiting example provided for understanding, the premises devices 16, may be grouped in the following order.

1) Living Room
2) Family Room
3) Kitchen
4) Master Bedroom
5) Bedroom 1
6) Bedroom 2
7) Bedroom 3
8) Garage
9) Custom Area 1
10) Custom Area 2
11) Custom Area 3
12) System Devices, such as key fobs In at least one embodiment, the system 10, such as via the management device 18, assigns zone numbers to the premises devices 16 based on the type of device being enrolled, such as in the following example order within the specified area above:

1) Door Sensor
2) Window Sensor
3) Motion Sensor
4) Glass Break Sensor
5) Occupancy Sensor
6) Smoke Detector
7) CO Detector
8) Heat Detector
9) Water Leak Detector
10) Temperature Sensor
11) Other Sensor 1
12) Other Sensor 2
13) Other Sensor 3

In an example embodiment provided for ease of understanding and not as a limitation as to what premises devices 16 may be installed at a particular premises 12, a system 10 has the following ten premises devices 16 that are to be installed:

1) Front Door
2) Patio Door
3) Garage Door
4) Bedroom Window
5) Living Room Motion
6) Family Room Motion
7) Hallway Smoke Detector
8) Hallway CO Detector
9) Kitchen Heat Detector
10) Kitchen Sink Water Leak Detector Continuing with the example above, the example system 10, such as via the management device 18, automatically assigns the following zone numbers to the premises devices 16:

Zone 1: Front Door
Zone 2: Living Room Motion
Zone 3: Patio Door
Zone 4: Family Room Motion
Zone 5: Kitchen Heat Detector
Zone 6: Kitchen Sink Leak Detector
Zone 7: Bedroom Window
Zone 8: Garage Door
Zone 9: Hallway Smoke Detector
Zone 10: Hallway CO Detector The system 10, such as through the management device 18, may then push the updated zone number list to all the relevant databases (not shown), such as at or via the remote monitoring system 22. Moreover, the management device 18 may, in response to any premises devices 16 being removed or added, evaluate whether to update the arrangement and assignment of zone numbers, and, if necessary, re-assign zone numbers to all the premises devices 16.

Thus, system 10 provides an automated way to add and remove premises devices 16 and preserve or create organized zones, without the need for an operator to manually adjust the system configuration each time a premises device 16 is added or removed from system 10.

The concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The functions and acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

The art that the present disclosure is not limited to what has been particularly shown and described herein above. In addition, unless mention was made above to the contrary, all of the accompanying drawings are not to scale. A variety of modifications and variations are possible in light of the above teachings without departing from the scope and spirit of the disclosure.

What is claimed is:

1. A premises security system comprising:
processing circuitry configured to:
    detect a change to a quantity of a plurality of premises devices located at the premises, the change comprising one of an addition or a removal of a first premises device of the plurality of premises devices, the plurality of premises devices being configured according to a system configuration where each of the plurality of premises devices is:
    associated with at least one of a plurality of zones that are monitored by the premises security system; and
    assigned at least one zone number corresponding to the at least one zone monitored by the premises device; and
    in response to detecting the change to the quantity of the plurality premises devices, manage the system configuration of the plurality of premises devices at least by making at least one modification to at least one of the plurality of zone numbers assigned to at least one of the plurality of premises devices.

2. The premises security system of claim 1, wherein the processing circuitry is further configured to cause transmission to a remote monitoring system of data representing the configuration subsequent to making the at least one modification to the at least one of the plurality of zone numbers.

3. The premises security system of claim 1, wherein the change to the quantity of the plurality of premises devices is the addition of the first premises device, and the at least one modification to at least one of the plurality of zone numbers comprises:
    the assignment of the zone number of the first premises device; and
    a modification of the zone number of at least one other of the plurality of premises devices.

4. The premises security system of claim 3, wherein the assignment of the zone number of the first premises device is based on at least one of a location within the premises of the first premises device or a type of the first premises device.

5. The premises security system of claim 1, wherein the change to the quantity of the plurality of premises devices is the removal of the first premises device, and the at least one modification to at least one of the plurality of zone numbers comprises:
    the removal of the zone number of the first premises device; and a modification of the zone number of at least one other of the plurality of premises devices.

6. The premises security system of claim 1, wherein the processing circuitry is further configured to identify the first premises device upon request by a person.

7. The premises security system of claim 6, wherein the identification is based on at least one of a quick response (QR) code or barcode.

8. The premises security system of claim 1, wherein the processing circuitry is further configured to update a monitoring setting of each of the plurality of premises devices.

9. The premises security system of claim 8, wherein the monitoring setting includes a sensor sensitivity setting.

10. The premises security system of claim 8, wherein the monitoring setting is based on a respective zone number of each of the plurality of premises devices.

11. A method performed on a premises security system, the method comprising:

detecting a change to a quantity of a plurality of premises devices located at the premises, the change comprising one of an addition or a removal of a first premises device of the plurality of premises devices, the plurality of premises devices being configured according to a system configuration where each of the plurality of premises devices is:

associated with at least one of a plurality of zones that are monitored by the premises security system; and assigned at least one zone number corresponding to the at least one zone monitored by the premises device; and in response to detecting the change to the quantity of the plurality of premises devices, managing the system configuration of the plurality of premises devices at least making at least one modification to at least one of the plurality of zone numbers assigned to at least one of the plurality of premises devices.

12. The method of claim 11, further comprising causing transmission to a remote monitoring system of data representing the configuration subsequent to making the at least one modification to the at least one of the plurality of zone numbers.

13. The method of claim 11, wherein the change to the quantity of the plurality of premises devices is the addition of the first premises device, and the at least one modification to at least one of the plurality of zone numbers comprises:

the assignment of the zone number of the first premises device; and a modification of the zone number of at least one other of the plurality of premises devices.

14. The method of claim 13, wherein the assignment of the zone number of the first premises device is based on at least one of a location within the premises of the first premises device or a type of the first premises device.

15. The method of claim 11, wherein the change to the quantity of the plurality of premises devices is the removal of the first premises device, and the at least one modification to at least one of the plurality of zone numbers comprises:

the removal of the zone number of the first premises device; and a modification of the zone number of at least one other of the plurality of premises devices.

16. The method of claim 11, further comprising identifying the first premises device upon request by a person.

17. The method of claim 16, wherein the identification is based on at least one of a quick response (QR) code or barcode.

18. The method of claim 11, further comprising updating a monitoring setting of each of the plurality of premises devices.

19. The method of claim 18, wherein the monitoring setting includes a sensor sensitivity setting.

20. The method of claim 18, wherein the monitoring setting is based on a respective zone number of each of the plurality of premises devices.

* * * * *